TIME DIVISION MULTIPLEX TRANSMISSION SYSTEMS

Filed May 18, 1953

INVENTORS
Thomas H. Flowers,
& Frank Scowen,
BY Hall + Houghton
ATTORNEY 2,938,954

TIME DIVISION MULTIPLEX TRANSMISSION SYSTEMS

Thomas Harold Flowers, Mill Hill, London, and Frank Scowen, Chislehurst, England, assignors to Her Majesty's Postmaster General, London, England Filed May 18, 1953, Ser. No. 355,628

Claims priority, application Great Britain May 20, 1952

4 Claims. (Cl. 179—15)

This invention relates to time division multiplex transmission systems. Time division multiplex systems are quite well known in telephony as illustrated, for example, in prior U.S. patents to T. H. Flowers, Nos. 2,666,809 issued January 19, 1954, and 2,770,678 issued November 13, 1956. For the purpose of the present disclosure, it suffices to state that in such systems speech and/or signal transmissions from a plurality of circuits are multiplexed over a common transmission path by modulating each of said speech and/or signal transmissions so that it is applied to said common path in the form of a train of time spaced pulses having a predetermined pulse duration and pulse repetition rate, with the pulses of each transmission allotted their own time intervals in repetitive order between the pulses of other transmissions. The pulse trains so applied to a common transmission path conventionally have the same pulse repetition frequency, and the pulse repetition frequency of said trains, and the minimum pulse spacing time required, determines the number of transmissions or separate "pulse channels" which can be carried on a time division multiplex basis on the common transmission path, which number of pulse channels is herein designated N. As is well known to those skilled in the art, and exemplified in the aforesaid prior patents, the pulse modulated signals are selectively delivered from the common transmission path to selected subscribers lines or links, by gating means controlled by pulses synchronized with the pulses of the particular "pulse channel" by which the selected signal is being transmitted through the common path. The gating means are ordinarily associated with equipment constituting demodulator means for restoring the transmitted signals, in one fashion or another, to a non-pulse modulated form. A time division multiplex equipment of this sort which so pulse modulates signals, applies them to a common transmission path, selects only a desired one of a number of delivery paths, and synchronously gates a particular signal from the common transmission path to such selected delivery path is frequently termed a time division multiplex switch.

One object of the invention is to facilitate metering of subscribers' calls in an automatic electronic telephone exchange of the type using time division multiplex switches, although the invention will be seen to have other applications.

According to the invention there is provided a time division multiplex pulse transmission system comprising a first common transmission path carrying a plurality of time-spaced pulse trains such that the reciprocal of the product of the pulse repetition frequency and the minimum pulse spacing time of the said pulse trains is N, and means for connecting the said first common transmission path to a second common transmission path for the time of one pulse in every $j$ minimum pulse spacing times of the said pulse trains, wherein $j$ is prime to N so that there is produced in the said second common transmission path a pulse train corresponding to, but having a lower pulse repetition frequency than, each of the said pulse trains carried by the said first common transmission path.

In applying the invention to a time division multiplex communication system, in addition to a multiplex apparatus providing a plurality of trains of pulses corresponding to intelligence channels, there is provided a second multiplex apparatus providing a plurality of trains of pulses corresponding to signal channels other than speech or like intelligence channels, the said signal channels being applied to a common transmit path and a common receive path corresponding to said first transmission path and said second transmission path respectively whereby the said second mentioned trains of pulses have a lower pulse repetition rate than that of the trains of pulses of the signal channels applied to the said transmit path.

In a telephone exchange constructed and arranged to operate in accordance with the invention, the signal channel pulses are utilised to operate a subscriber's meter and in a particular form of such exchange, the signal pulses are of sufficient duration to effect striking of a cold cathode thyratron type of discharge valve the current through which is used to operate the meter.

The invention will now be described with reference to the accompanying drawings in which.

Figures 1, 2:
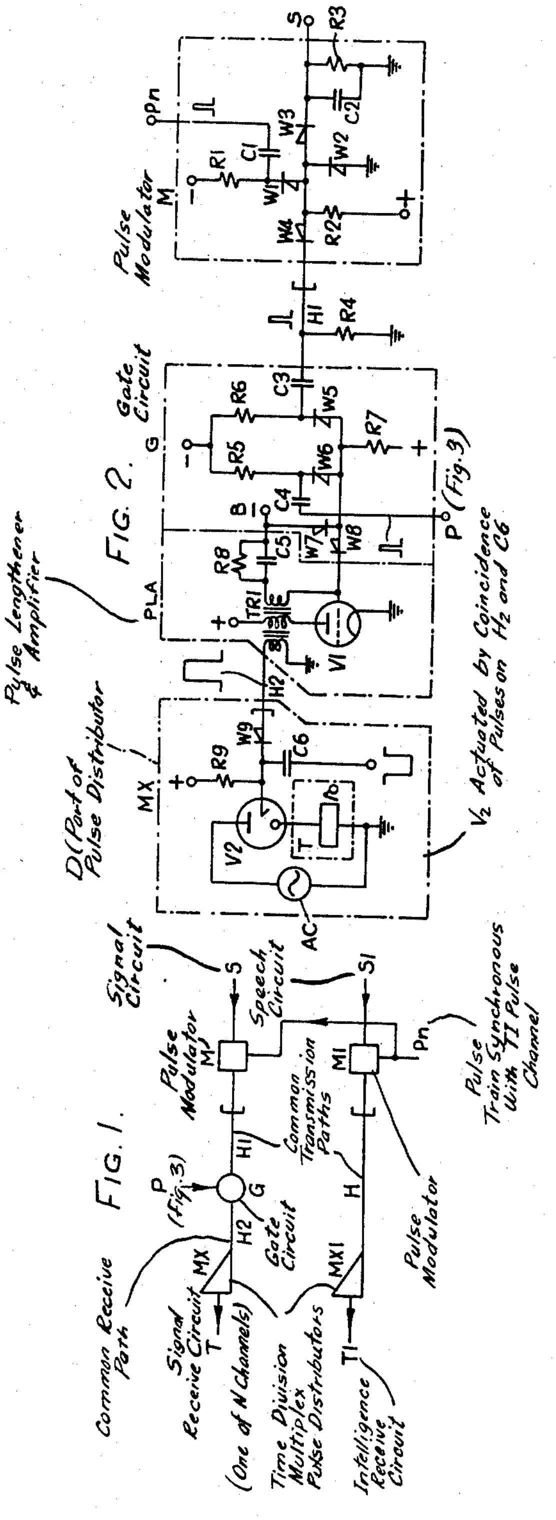
Fig. 1 is an illustrative block diagram of a time division multiplex communication system.
Fig. 2 shows a circuit arrangement of the application of the invention to a telephone exchange of the type referred to, and Fig. 3 shows the pulse potential wave forms appearing at selected points in the circuits of Fig. 2.

Referring to Fig. 1 of the drawings MX1 is a pulse distributor which distributes time-spaced pulse trains on a common transmission path H to N channels one of which T1, is shown. To the common path H are connected a number of pulse modulators one of which, M1 is shown. A speech circuit S1, associated with pulse modulator M1 can be connected to a channel T1 by connecting to the pulse modulator M1 a pulse train *pn*, the pulses of which are synchronous with the times of connection of the channel T1 to the common transmission path H by the distributor MX1. In this particular application of the invention the speech circuit S1 is used to transmit speech signals to a receiver connected to channel T1. A plurality of circuits S1, each connected by a pulse modulator M1 to the common path H, is provided and each circuit S1 may be connected to any one of the channels T1 upon the application to the modulator M1 of the said circuit S1 of an appropriately timed pulse train *pn*. The pulse modulators M1, the common path H, and the pulse distributor MX1 provide a time division multiplex transmission system having N channels where N is the reciprocal of the product of the pulse repetition frequency and the channel time spacing of the channel pulse trains of the multiplex.

It is well known that in time division multiplex transmission systems, the pulse repetition frequency of the multiplex apparatus must exceed twice the highest modulating frequency, and may well be 10 kc./s. for telephone speech transmission. It is also commonly required to transmit controlling signals over a signal path running parallel with the speech path. The signal path may comprise a signal channel as part of an exchange trunk and over which signals are communicated to a second pulse modulator M similar to M1 and pulsed by the same pulse-train *pn*, a transmission path common to the outputs of the second pulse modulators, and connected to a second pulse distributor MX similar to MX1 and distributing pulses received over the common path to signal circuits T each corresponding to a speech circuit T1. The pulse repetition frequency of the signal transmission system is then the same as that of the speech transmission system and is usually unnecessarily high in relation to the highest frequency transmitted over the signal system. Meter signals, for example, are simple on-off signals in which the minimum time between an on and an off signal is commonly 100 m. secs. Simpler apparatus with a much lower pulse repetition frequency is thus often permissible for signal transmission. However in an exchange switching system where the pulse-train *pn* has to be selected for each connection made, to use a slower speed multiplex signal transmission system implies in addition to the selection of a pulse-train *pn* the selection of a corresponding lower repetition frequency pulse train for signalling. The advantage of a lower pulse repetition frequency is of not so much importance in the pulse modulators connecting the signal channels to the common transmission path as in the pulse distributor and signal circuits. By employing the system according to the present invention and applying the output from said second pulse modulators M to the first common transmission path H1 of the system and connecting the second pulse distributors MX to the second common transmission path of the system, the pulse repetition frequency of the pulses applied to the second pulse distributors MX and distributed thereby to the signal circuits T, will be lower than that of the signal pulses received over the signal channel. In this manner the convenience and economy of utilising only one pulse train *pn* for each speech and signal connection is combined with the economy obtained by the use of low speed signal receiving apparatus.

Thus, and referring again to Figure 1, a signal channel S is shown connected to a pulse modulator M the output of which is applied to a common transmit path H1. The signal channel S and the previously mentioned speech circuit S1 are part of the same communication circuit and the modulators M and M1 are pulsed by the same pulse train *pn*. The signal pulse trains which appear on the common transmit path H1 are therefore synchronous with the speech circuit pulse trains which appear on the common transmission path H. The common transmit path H1 is connected by a gate circuit G to a common receive path H2, the said gate circuit having applied thereto over lead P a pulse train the pulses of which coincide with the time of one pulse on the transmit path H1 once in every *j* minimum pulse spacing times of the pulse trains on the transmit path H1. The numbers N and *j* are chosen to be prime to one another. Thus the gate circuit G is open to communicate a pulse from common transmit path H1 to common receive path H2 only when a pulse appears on lead P and there is transmitted over common receive path H2 a time division multiplex transmission of N channels the pulse repetition frequency of which is equal to $1/j$ of that of the common transmit path H1. The highest sinusoidal frequency which can be transmitted over the receiver path H2 is reduced in like ratio but is still adequate for the purposes of signal transmission.

The signal circuits T are connected to the common receive path H2 by a pulse distributor MX having a pulse repetition time equal to $1/j$ of that of the distributor MX1. The pulses received over the common receive path H2 may be lengthened and if desired, amplified to suit the lower speed distributor MX. If the signals to be transmitted are on-off signals, the lengthening and amplification of the channel pulses may advantageously be effected by a non-shot trigger device such as for example a blocking oscillator. Such an arrangement will be hereinafter described with reference to Figure 2 of the drawings.

Referring now to Fig. 2 showing the circuit arrangement of the application of the invention to a telephone exchange using time division multiplex switches, a pulse modulator M operates in the following way. The resistances of resistors R1 and R2 and the potential of the potential sources to which they are connected are so chosen, that in the absence of a signal on lead S or a pulse on lead *pn*, the common junction of the four rectifiers W1–W4 is slightly below earth potential. In the presence of a pulse on lead *pn* and a positive potential on lead S, the potential of the junction of the four rectifiers rises to that of lead S and the rise in potential is transferred through rectifier W4 to the common transmit path H1 where a positive going pulse is developed across resistor R4, the said positive going pulse being applied to capacitor C3 of gate circuit. The resistances of resistors R5, R6, R7 of the gate circuit G and the potentials of the potential sources to which they are connected are so chosen that in the absence of a pulse on the common transmit path H1 or on lead P, the potential of the junction of the four rectifiers W5–W8 is similar to that of the negative bias source B, to which source one end of resistor R8 is connected, the said bias source B being preferably less negative than the common connection of resistors R5 and R6. In the presence of coincident positive going pulses on the common transmit path H1 and on lead P however the potential of the junction of the four rectifiers rises and the rise in potential is transferred through rectifier W8 to the grid of valve V1 of a pulse lengthening and amplifying circuit PLA. The valve V1 with transformer TR1, capacitor C5 and resistor R8 forms a blocking oscillator which is normally prevented from oscillating by the negative potential source B to which the end of resistor R8 is connected. When a positive going pulse is applied to the grid of valve V1 the blocking oscillator fires and produces in the windings of transformer TR1 a pulse the amplitude of which is determined by the operating conditions of the valve and the turns ratio of the transformer and the duration of which is determined mainly by the self resonant frequency of the transformer. The duration of a pulse from the blocking oscillator is arranged to be shorter than the time between adjacent pulses applied to lead P. The pulses from the blocking oscillator are applied through one of the windings of transformer TR1 to the common receive path H2 as positive going pulses.

Part of the pulse distributor circuit MX is shown at D in Figure 2 and includes a connection to a subscriber's meter which forms the signalling circuit T. It will be understood that the distributor MX is generally of known construction such as for example that disclosed in Figure 3*a* of applicant's prior patent specification No. 2,666,809 and only that part D of the distributor circuit which is necessary to an understanding of the invention is shown in Figure 2. A plurality of circuits D are commoned to the receive path H2 and each circuit is pulsed in cyclic order by a pulse applied to the condenser C6 of each circuit D. A positive going pulse on the common receive path H2, or a negative going pulse applied to the lower end of capacitor C6 charges the upper plate of the said capacitor positively but since the rectifier W9 is not caused to conduct in its low resistance direction of conductance the potential of the said upper plate is insufficient to cause the cold cathode thyratron V2 to strike. The coincidence of a positive going pulse on the common receive path H2 and a negative going pulse applied to the lower end of capacitor C6 causes rectifier W9 to conduct in its low resistance direction of conductance and when the pulses end the potential of the upper plate of capacitor C6 is raised sufficiently to strike the cold cathode thyratron valve V2 when the anode potential of the said valve is positive. The valve V2 remains struck whilst the anode potential exceeds the maintaining potential and is restruck after about one half cycle of the anode supply AC if the signal is still present on lead S. The intermittent current through the thyratron valve V2 operates the meter T by the smoothed mean value of the current if the frequency of the anode supply AC exceeds the resolution frequency i.e. the highest frequency at which the meter will respond separately to successive pulses of the meter.

Figure 3:
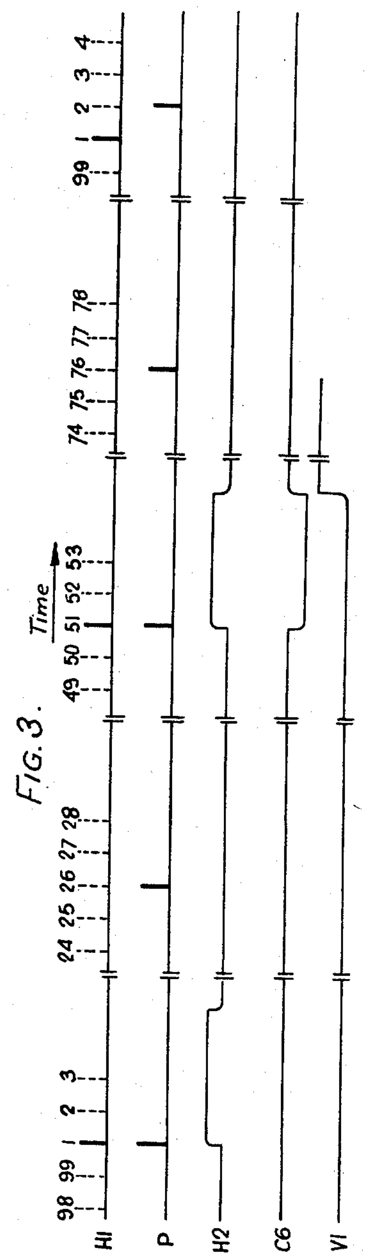

Fig. 3 shows in diagrammatic form the pulses that are present at selected points of the circuits shown in Fig. 2. In Fig. 3 at H1 are shown the pulses that are present on the common transmit path H1 when signals are present on the leads S of two of the pulse modulators M corresponding to channels 1 and 51 of the total number N of time division multiplex channels, illustrated as 99 channels in Fig. 3, graph H1. At P are shown the pulses that are applied over lead P to the gate circuit G and it will be noted that in the illustrative embodiment the pulses P occur in coincidence with the 1st, 26th, 51st and 76th pulses of the fully illustrated cycle of 99 time division channels, then during next ensuring (2nd, 27th, 52nd, and 77th) intervals of the next complete cycle, etc., finally returning to the fully illustrated synchrony after 25 such complete cycles, this progressing action being due to the fact that the number J (which is 25 in the illustrative embodiment) is prime to the number N (which is 99 in the illustrative embodiments). Otherwise expressed, the number J (e.g. 25) is not a "factor" of the number "N" (e.g. 99). At H2 are shown the pulses that are present on the common receive path H2 due to the coincidence of pulses P with pulses of channels 1 and 51 in Gate G (Fig. 2). At C6 are shown the pulses that are applied to the capacitor C6 of the fifty-first channel of the time division multiplex distributor MX, Fig. 1 (the 51st channel of such distributor being represented at D in Fig. 2) and V1 shows the potential of the upper plate of capacitor C6 and of the striking electrode of the valve V2 of the fifty-first channel D (Fig. 2) of the time division multiplex distributor MX (Fig. 1).

It will be appreciated from the preceding description that the meter channel pulses applied to common receive path H2, being of lower pulse repetition frequency than the speech channel pulses applied to common transmission path H, can be distributed and detected by apparatus exemplified at D in Fig. 2 which is cheaper to construct than apparatus MXI (Fig. 1) designed to distribute and detect the speech channel pulses.

The pulse train applied to lead P and the pulse trains applied to the condensers C6 of the distributors MX may be generated by known means. Thus for example, the pulse train applied to lead P may be obtained by frequency-division of a master source of pulses from which the pulse trains *pn* are derived, the pulses applied over lead P being further frequency divided to provide the pulses for the distributors MX. Methods of generating pulse in desired synchrony are well known to those skilled in the art and per se form no part of the present invention. As just indicated, one way of deriving the gating pulses appropriate for the pulse timing diagram of Figure 3 is to start with a master (or clock) pulse source generating all the 99 pulses shown on the line H1 of Figure 3. These 99 pulses may then be fed into a pulse distributor having 99 outlets so that pulses are delivered from successive outlets one at a time as the clock pulses are fed to the input of the pulse distributor, thus providing 99 sources of pulses P*n*. The clock pulses may also be fed to another pulse distributor (or counter ring) having 25 stages and an output terminal connected to one stage only so that this counter will deliver one pulse in every 25 clock pulses to supply the P pulses on the line P of Figure 3. Such an arrangement is disclosed in U.S. Patent No. 2,786,891 in which a counter is employed to deliver one pulse every *n* pulses, *n* in this case being equal to the number of channels, and reference may also be had to Flowers Patent No. 2,666,809 issued January 19, 1954, Figs. 3*b* and 4 and columns 8–9 with respect to generation of pulses according to a desired pulse timing diagram, and it will be understood that the present invention is not limited to any particular apparatus for delivering the pulses, as long as such pulses are related in the manner exemplified in Fig. 3 herein.

We claim:

1. A time division multiplex pulse transmission system comprising, in a multi-channel multiplex, a transmission path, a receive path, pulse operable gate circuit means connecting said transmission path to said receive path; a plurality of pulse modulators connected to said transmission path, signal transmit channels connected respectively to said pulse modulators, a first source of pulse trains, means connecting said first source to said pulse modulators for producing on said transmission path a plurality of time space pulse trains modulated by the signals transmitted over said signal transmit channels and multiplexed by said pulse modulators; a plurality of signal receive circuits, pulse distributing means connecting said receive circuits to said receive path, a second source of pulse trains having a pulse repetition frequency lower than the pulse repetition frequency of the pulse trains of said first source, the pulses of said second source pulse trains coinciding with the time of one pulse of said first source pulse trains once in a selected number of minimum pulse spacing times of said first source pulse trains, the said selected number being prime to the number of channels of said multichannel multiplex, means for connecting said second source to said gate circuit means for effecting operation thereof to produce on said receive path time spaced pulse trains corresponding to but having a lower pulse repetition frequency than the time spaced pulse trains on said transmission path, and means connecting said second source to said pulse distributors for gating to said signal receive circuits, respectively, pulse trains from said receive path having said lower pulse repetition frequency.

2. A time division multiplex pulse transmission system comprising, in a multi-channel multiplex, a signal transmission path, a receive path, pulse operable gate circuit means connecting said signal transmission path to said receive path, and an intelligence transmission path; a plurality of signal pulse modulators connected to said signal transmission path, signal transmit channels connected respectively to said signal pulse modulators, a plurality of intelligence pulse modulators connected to said intelligence transmission path, intelligence transmit channels connected respectively to said intelligence pulse modulators, there being an intelligence transmit channel for each signal transmit channel; a first source of pulse trains, means connecting said first source to said pulse modulators for producing on said signal and intelligence transmission paths a plurality of time space signal and intelligence pulse trains respectively modulated by the signals transmitted over said signal transmit channels and the intelligence transmitted over said intelligence transmit channels and multiplexed by said pulse modulators; a plurality of intelligence receive circuits, intelligence pulse distributing means connecting the said intelligence receive circuits to said intelligence transmission path, means connecting said first source to said intelligence pulse distributing means for gating to said intelligence receive circuits, respectively, separate pulse trains from said intelligence transmission path; a plurality of signal receive circuits, there being a signal receive circuit for each of said intelligence receive circuits, signal pulse distributing means connecting said signal receive circuits to said receive path, a second source of pulse trains having a pulse repetition frequency lower than the pulse repetition frequency of the pulse trains of said first source, the pulses of said second source pulse trains coinciding with the time of one pulse of said first source pulse trains once in a selected number of minimum spacing times of said first source pulse trains, the said selected number being prime to the number of channels of said multi-channel multiplex, means for connecting said second source to said gate circuit means for effecting operation thereof to produce on said receive path time spaced pulse trains corresponding to but having a lower pulse repetition frequency than the time spaced pulse trains on said transmission path, and means connecting said second source to said signal pulse distributing means for gating to said signal receive circuits, respectively, pulse trains from said receive path having said lower pulse repetition frequency.

3. A time division multiplex signal transmission system as claimed in claim 1 in which a pulse lengthening device is connected between the said gate circuit and the said receive path.

4. A time division multiplex signal transmission system as claimed in claim 1 in which a blocking oscillator is connected between the gate circuit and the receive path and is adapted, upon receiving a pulse transmitted by the gate circuit from the signal transmission path, to generate on said receive path a pulse which is of longer duration than the said transmitted pulse.

References Cited in the file of this patent

UNITED STATES PATENTS

| | | |
|---|---|---|
| 2,490,039 | Earp | Dec. 6, 1949 |
| 2,578,083 | Montani | Dec. 11, 1951 |
| 2,666,809 | Flowers | Jan. 19, 1954 |
| 2,708,220 | Levy | May 10, 1955 |
| 2,754,367 | Levy | July 10, 1956 |

OTHER REFERENCES

"An Experimental Multichannel Pulse Code Modulation System of Toll Quality," Meacham and Peterson, "The Bell System Technical Journal," January 1948, pages 1–43.